(12) United States Patent
Staggs

(10) Patent No.: US 6,433,729 B1
(45) Date of Patent: Aug. 13, 2002

(54) SYSTEM AND METHOD FOR DISPLAYING VERTICAL PROFILE OF INTRUDING TRAFFIC IN TWO DIMENSIONS

(75) Inventor: Thomas J. Staggs, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/670,303

(22) Filed: Sep. 26, 2000

Related U.S. Application Data

(60) Provisional application No. 60/156,465, filed on Sep. 27, 1999.

(51) Int. Cl.[7] ................................................. G01S 13/93

(52) U.S. Cl. .............................. 342/29; 342/30; 342/32; 342/36; 342/37; 342/179; 342/455; 701/301

(58) Field of Search ............................... 342/29, 30, 32, 342/36, 37, 38, 42, 46, 176, 179, 180, 455, 456; 701/3, 4, 301, 207; 340/974, 975

(56) References Cited

U.S. PATENT DOCUMENTS

| | | | | |
|---|---|---|---|---|
| 5,157,615 A | * | 10/1992 | Brodegard et al. | 701/301 |
| 6,057,786 A | * | 5/2000 | Briffe et al. | 340/975 |
| 6,222,480 B1 | * | 4/2001 | Kuntman et al. | 342/30 |
| 2001/0047229 A1 | * | 11/2001 | Staggs | 701/3 |

* cited by examiner

Primary Examiner—John B. Sotomayor

(57) ABSTRACT

A circuit and method for displaying a vertical profile view of situational awareness information.

37 Claims, 12 Drawing Sheets

SYSTEM AND METHOD FOR DISPLAYING VERTICAL PROFILE OF INTRUDING TRAFFIC IN TWO DIMENSIONS

This application claims the benefit of U.S. Provisional Application Ser. No. 60/156,465, filed in the name of Thomas J. Staggs on Sep. 27, 1999, the complete disclosure of which is incorporated herein by reference.

FIELD OF THE INVENTION

The present invention relates generally to aircraft collision avoidance systems, and particularly, to displaying air traffic information on a Traffic Alert and Collision Avoidance System, or TCAS.

BACKGROUND OF THE INVENTION

Aircraft pilots are expected to visually identify collision threats and avoid them. This "see and avoid" technique based on the pilot's visual sense remains the most basic method of aircraft collision avoidance. However, since the 1950's electronic techniques based on radio frequency and optical transmissions have been developed to supplement the pilot's visual sense. The government has developed and implemented a system of ground based and aircraft carried equipment designated the Air Traffic Control Radar Beacon System (ATCRBS). This system includes two different types of ground based radar emitters located at each of a plurality of Air Traffic Control (ATC) stations. One type of radar is referred to as the Primary Surveillance Radar (PSR), or simply as the primary radar. The primary radar operates by sending out microwave energy that is reflected back by the aircraft's metallic surfaces. This reflected signal is received back at the ground radar site and displayed as location information for use by an air traffic controller. The second type of radar is referred to as the Secondary Surveillance Radar (SSR), or simply secondary radar. Unlike the primary radar, the SSR is a cooperative system in that it does not rely on reflected energy from the aircraft. Instead, the ground based SSR antenna transmits a coded 1030 MHz microwave interrogation signal. A transponder, i.e., a transmitter/receiver, carried on the aircraft receives and interprets the interrogation signal and transmits a 1090 MHz microwave reply signal back to the SSR ground site. This receive and reply capability greatly increases the surveillance range of the radar and enables an aircraft identification function, referred to as Mode-A, wherein the aircraft transponder includes an identification code as part of its reply signal. This identification code causes the aircraft's image or blip on the ATC operator's radar screen to stand out from the other targets for a short time. Thus, Mode-A provides an rudimentary identification function.

In addition to the identification function provided by Mode-A, the aircraft altimeter data are typically passed to the transponder such that a reply signal includes altitude information, referred to as Mode-C.

A ground based SSR sequentially transmits both Mode-A and Mode-C interrogation signals to aircraft in the area. Accordingly, the interrogation signal transmitted by the SSR contains three pulses. The second pulse is a side-lobe suppression signal transmitted from an omnidirectional antenna collocated with a mechanically rotating antenna which provides a highly directive antenna beam. The first and third pulses are transmitted by the directive antenna at a predetermined frequency and are separated by a predetermined interval. The time interval between the first and third pulses defines what information the interrogator is requesting: eight (8) microseconds for identification and twenty-one (21) microseconds for altitude. The operator of the ground based SSR sets the radar interrogation code to request either Mode-A or Mode-C replies from the aircraft transponder. Typically, the radar is set to request a sequence of two Mode-A replies followed by a single Mode-C reply. This sequence is repeated so that a radar operator continuously receives both the Mode-A identification code and the Mode-C altitude information. Upon receipt of the interrogation signal, the aircraft transponder develops and transmits a reply signal which includes the identification or altitude information. The ground based SSR receives and processes the transponder reply signal, together with time of arrival range information, to develop a measurement of position for each responding aircraft. Under such a system, the air traffic controller uses this information to involve the aircraft by radio, usually with voice communication, to maintain or restore safe separations between aircraft. The system is inherently limited because each aircraft needs be dealt with individually, which requires a share of the air traffic controller's time and attention. When traffic is heavy, or visibility is low, collision potential increases.

During the 1960's the increases in the number of aircraft, the percentage of aircraft equipped with transponders, and the number of ATCRBS radar installations began to overload the ATCRBS system. This system overload caused a significant amount of interference and garble in the Mode-A and Mode-C transmissions because of replies from many simultaneously interrogated aircraft. Furthermore, the Mode-A and Mode-C systems are unable to relay additional information or messages between the ground based SSR and the interrogated aircraft, other than the aforementioned identification and altitude information. The Mode Select, or Mode-S, was the response to this overload and other deficiencies in ATCRBS. Mode-S is a combined secondary surveillance radar and a ground-air-ground data link system which provides aircraft surveillance and communication necessary to support automated ATC in the dense air traffic environments of today.

Mode-S incorporates various techniques for substantially reducing transmission interference and provides active transmission of messages or additional information by the ground based SSR. The Mode-S sensor includes all the essential features of ATCRBS, and additionally includes individually timed and addressed interrogations to Mode-S transponders carried by aircraft. Additionally, the ground based rotating directive antenna is of monopulse design which improves position determination of ATCRBS target aircraft while reducing the number of required interrogations and responses, thereby improving the radio frequency (RF) interference environment. Mode-S is capable of common channel interoperation with the ATC beacon system. The Mode-S system uses the same frequencies for interrogations and replies as the ATCRBS. Furthermore, the waveforms, or modulation techniques, used in the Mode-S interrogation signal were chosen such that, with proper demodulation, the information content is detectable in the presence of overlaid ATCRBS signals and the modulation of the downlink or reply transmission from the transponder is pulse position modulation (PPM) which is inherently resistant to ATCRBS random pulses. Thus, the Mode-S system allows full surveillance in an integrated ATCRBS/Mode-S environment.

The Radio Technical Commission for Aeronautics (RTCA) has promulgated a specification for the Mode-S system, RTCA/DO-181A, *MINIMUM OPERATIONAL PERFORMANCE STANDARDS FOR AIR TRAFFIC CONTROL RADAR BEACON SYSTEM/MODE SELECT*

(ATCRBS/MODE-S) AIRBORNE EQUIPMENT, issued January 1992, and incorporated herein by reference. According to RTCA specification DO-181A, the airborne portion of the Mode-S system includes in one form or another at least a dedicated transponder, a cockpit mounted control panel, two dedicated antennas and cables interconnecting the other elements. As discussed more fully below, each aircraft may be within range of more than one SSR ground station at any time and must respond to interrogation signals broadcast from multiple directions. Therefore, the Mode-S system typically uses two single element omnidirectional antennas to receive interrogation signals from any quadrant and reply in kind.

In operation, a unique 24-bit address code, or identity tag, is assigned to each aircraft in a surveillance area by one of two techniques. One technique is a Mode-S "squitter" preformed by the airborne transponder. Once per second, the Mode-S transponder spontaneously and pseudo-randomly transmits, or "squitters," an unsolicited broadcast, including a specific address code unique to the aircraft carrying the transponder, via first one and then the other of its antennas which produce an omnidirectional pattern. The transponder's transmit and receive modes are mutually exclusive to avoid damage to the equipment. Whenever the Mode-S transponder is not broadcasting, it is monitoring, or "listening," for transmissions simultaneously on its omnidirectional antennas. According to the second technique, each ground based Mode-S interrogator broadcasts an ATCRBS/Mode-S "All-Call" interrogation signal which has a waveform that can be understood by both ATCRBS and Mode-S transponders. When an aircraft equipped with a standard ATCRBS transponder enters the airspace served by an ATC Mode-S interrogator, the transponder responds the with a standard ATCRBS reply format, while the transponder of a Mode-S equipped aircraft replies with a Mode-S format that includes a unique 24-bit address code, or identity tag. This address, together with the aircraft's range and azimuth location, is entered into a file, commonly known as putting the aircraft on roll-call, and the aircraft is thereafter discretely addressed. The aircraft is tracked by the ATC interrogator throughout its assigned airspace and, during subsequent interrogations, the Mode-S transponder reports in its replies either its altitude or its ATCRBS 4096 code, depending upon the type of discrete interrogation received. As the Mode-S equipped aircraft moves from the airspace served by one ATC Mode-S interrogator into that airspace served by another Mode-S interrogator, the aircraft's location information and discrete address code are passed on via landlines, else either the ground based SSR station picks up the Mode-S transponder's "squitter" or the Mode-S transponder responds to the All-Call interrogation signal broadcast by the next ATC Mode-S interrogator.

The unique 24-bit address code, or identity tag, assigned to each aircraft is the primary difference between the Mode-S system and ATCRBS. The unique 24-bit address code allows a very large number of aircraft to operate in the air traffic control environment without an occurrence of redundant address codes. Parity check bits overlaid on the address code assure that a message is accepted only by the intended aircraft. Thus, interrogations are directed to a particular aircraft using this unique address code and the replies are unambiguously identified. The unique address coded into each interrogation and reply also permits inclusion of data link messages to and/or from a particular aircraft. To date, these data link messages are limited to coordination messages between TCAS equipped aircraft, as discussed below. In future, these data link messages are expected to include Aircraft Operational Command (AOC) information consisting of two to three pages of text data with flight arrival information, such as gates, passenger lists, meals on board, and similar information, as well as Flight Critical Data (FCD). However, the primary function of Mode-S is surveillance and the primary purpose of surveillance remains collision avoidance.

The transponder reply emissions from the ATCRBS, including Mode-S, described above alone provide the only information for locating and identifying potential threats. While such responsive systems tend to be simple, relatively low cost, and do not crowd the spectrum with additional RF transmissions, detection of transponder emissions from other aircraft is difficult. The government and aviation industry have cooperated in developing Operational Performance Standards for a Traffic Alert and Collision Avoidance System, known as TCAS, separate from the ATCRBS/Mode-S transponder system. The standards are set forth in the RTCA specifications DO-185, *MINIMUM OPERATIONAL PERFORMANCE STANDARDS FOR AIR TRAFFIC ALERT AND COLLISION AVOIDANCE SYSTEM (TCAS) AIRBORNE EQUIPMENT*, issued Sep. 23, 1983, consolidated Sep. 6, 1990, and DO-185A, *MINIMUM OPERATIONAL PERFORMANCE STANDARDS FOR AIR TRAFFIC ALERT AND COLLISION AVOIDANCE SYSTEM II (TCAS II) AIRBORNE EQUIPMENT*, issued December 1997, both of which are incorporated herein by reference.

FIG. 1 illustrates one known embodiment of the TCAS 1 having 4-element interferometer antennas 2A and 2B coupled to a radio frequency receiver 3 of a TCAS processor 4. Receiver 3 is coupled in turn to a signal processor 5 operating known traffic alert and collision avoidance software. A radio frequency transmitter 6 is coupled to signal processor 5 for broadcasting Mode-S interrogation signals. An associated control panel 7 for operating TCAS 1 and display 8 for displaying TCAS information are each coupled to signal processor 5 of TCAS processor 4, as described in each of U.S. Pat. No. 4,855,748 entitled, *TCAS BEARING ESTIMATION RECEIVER USING A 4 ELEMENT ANTENNA*, issued on Aug. 8, 1989, to Ruy L. Brandao et al and U.S. patent application Ser. No. 09/369,752 entitled, *MULTIFUNCTION AIRCRAFT TRANSPONDER*, filed on Aug. 6, 1999, in the names of Daryal Kuntman, Ruy L. Brandao, and Ruy C. P. Brandao, the complete disclosures of which are incorporated herein by reference. TCAS is a well-known active collision avoidance system that relies upon reply signals from airborne transponders in response to interrogation signals from an aircraft equipped with an ATCRBS Mode-A/Mode-C or Mode-S transponder. The TCAS antenna is driven to produce a directional microwave transmission, or radiation, pattern carrying a transponder generated coded interrogation signal at 1030 MHz, the same frequency used by ground based SSR stations to interrogate Mode-S transponders. Whenever the TCAS transponder is not broadcasting, it is "listening" for Mode-S "squitters" and reply transmissions at 1090 MHz, the same frequency used by Mode-S transponders to reply to interrogation signals. Thus, a TCAS equipped aircraft can "see" other aircraft carrying a transponder. Once a transponder equipped target has been "seen," the target is tracked and the threat potential is determined by operation of known TCAS algorithms, as described in each of U.S. Pat. No. 5,077,673, *AIRCRAFT TRAFFIC ALERT AND COLLISION AVOIDANCE DEVICE*, issued Dec. 31, 1991, and U.S. Pat. No. 5,248,968, *TCAS II PITCH GUIDANCE CONTROL. LAW AND DISPLAY SYMBOL*, issued Sep. 28, 1993, the complete disclosures of which are incorporated herein by reference. Altitude information is essential in determining a target's threat potential. As described in incorporated U.S. Pat. No. 5,077,673 and U.S. Pat. No. 5,248,968, comparison between the altitude information encoded in the reply transmission from the threat aircraft and the host aircraft's altimeter is made in the TCAS processor and the pilot is directed obtain, a safe altitude separation by descending, ascending or maintaining current altitude.

Collision avoidance is enhanced by including range information during threat determination. The approximate range, or distance between the host aircraft and the target, is based on the elapsed time from transmission of the interrogation signal by the host aircraft to receipt of the responsive transponder signal from the target aircraft Knowledge of the direction, or bearing, of the target aircraft relative to the host aircraft's heading greatly enhances a pilot's ability to visually acquire the threat aircraft and provides a better spatial perspective of the threat aircraft relative to the host aircraft. The TCAS processor can display bearing information if it is available. Directional antennas are used in some TCAS systems for determining angle of arrival data which is converted into relative bearing to a threat aircraft by the TCAS processor. Several methods exist for determining angle of arrival data. One common arrangement uses a phase matched quadrapole antenna array with output signals being combined such that the phase difference between two output ports of the combining circuitry indicates the bearing of a received transponder signal. Another method for determining angle of arrival data includes a method based on signal phase, commonly known as phase interferometry. Still another commonly known method is based on signal amplitude. Attenuation of the received transponder signals by the airframe blocking the antenna from the transmitter is often overcome by locating a primary directional antenna on a top surface of the aircraft and a second antenna on a bottom surface of the aircraft. The second or bottom antenna is sometimes omnidirectional which reduces cost at the expense of reduced directional coverage. Other TCAS systems provide duplicate directional antennas top and bottom. U.S. Pat. No. 5,552,788, ANTENNA ARRANGEMENT AND AIRCRAFT COLLISION AVOIDANCE SYSTEM, issued Sep. 3, 1996, the complete disclosure of which is incorporated herein by reference, teaches an arrangement of four standard monopole antenna elements, for example, ¼ wavelength transponder antennas, arranged on opposing surfaces of one axis of the aircraft at the extremes of two mutually orthogonal axes to avoid shadowing and provide directional information about the received reply signal. For example, two monopole antennas are preferably mounted on a longitudinal axis of the aircraft and two additional monopole antennas are preferably mounted on a lateral axis of the aircraft orthogonal to the longitudinal axis passing through the first two antennas. Directionality is determined by comparing the power levels of the received signals. Additionally, U.S. Pat. No. 5,552,788 teaches a TCAS system which can transmit transponder interrogation signals directionally using predetermined ones of the monopole antennas, thus eliminating dependence upon ground based radar systems for interrogating threat aircraft transponders.

Other antennas for directionally transmitting TCAS system transponder interrogation signals are also commercially available. For example, a TCAS system-compatible directional antenna is commercially available from Honeywell International, Incorporated of Redmond, Washington, under the part number ANT 81A.

The ATCRBS/Mode-S surveillance system and the TCAS collision avoidance system are generally separate, the algorithms operated by the TCAS processor account for the data provided by the intruder aircraft to determine what evasive maneuver to recommend to the host aircraft's pilot, i.e., whether to recommend that the pilot maintain current altitude, ascend or descend. The TCAS system also uses the inter-aircraft data link provided by the addressable Mode-S transponder to coordinate the recommended evasive maneuver with a TCAS and Mode-S equipped intruder aircraft. Furthermore, a connection between the TCAS and Mode-S transponders and other avionics on an aircraft allows coordination between the TCAS and Mode-S transponders.

The TCAS is also coupled to provide an output signal to one or more displays as described in above incorporated U.S. patent application Ser. No. 09/369,752. The challenge of any traffic depiction is reducing 3-dimensional data into a 2-dimensional display. The function of the display is generally to visually define the level of threat posed by a given intruder, as well as the intruder's vertical position and motion relative to the host aircraft. Current traffic displays show the relative horizontal and lateral positions of conflicting traffic graphically, while relative vertical positions are depicted numerically.

FIG. 2 shows one configuration of a conventional display 10 used with a TCAS collision avoidance system. Display 10 includes an aircraft symbol 12 to depict the position of the host aircraft. A circle, formed by multiple dots 14 surrounding host aircraft position symbol 12, indicates a 2 nautical mile range from the host aircraft. Generally, semi circular indicia 16 around the periphery of indicator display 10 and a rotatable pointer 18 together provide an indication of the vertical, i.e., altitude, rate of change of the host aircraft. Indicia 16 are typically marked in hundreds of feet per minute.

Other target aircraft or "intruders" are identified on display 10 by indicia or "tags" 20, 22 and 24. Tags 20, 22, 24 are shaped as circles, diamonds or squares and are color coded (not shown) to provide additional information. Square 20 colored red represents an intruder entering warning zone and suggests an immediate threat to the host aircraft with prompt action being required to avoid the intruder. Circle 22 colored amber represents an intruder entering caution zone and suggests a moderate threat to the host aircraft recommending preparation for intruder avoidance. Diamond 24 represents near or "proximate traffic" when colored solid blue or white and represents more remote traffic or "other traffic" when represented as an open blue or white diamond. Air traffic represented by either solid or open diamond 24 is "on file" and being tracked by the TCAS.

Each indicia or tag 20, 22, 24 is accompanied by a two digit number preceded by a plus or minus sign. In the illustration of FIG. 2 for example, a "+05" is adjacent circle tag 20, a "−03" is adjacent square tag 22 and a "−12" is adjacent diamond tag 24. Each tag may also have an vertical arrow pointing either up or down relative to the display. The two digit number represents the relative altitude difference between the host aircraft and the intruder aircraft; the plus and minus signs indicating whether the intruder is above or below the host aircraft. Additionally, the two digit number appears positioned above or below the associated tag to provide a visual cue as to the intruder aircraft's relative position: the number positioned above the tag indicates that the intruder is above the host aircraft and the number positioned below the tag indicates that the intruder is below the host aircraft. The associated vertical arrow indicates the intruder aircraft's altitude is changing at a rate in excess of 500 feet per minute in the direction the arrow is pointing. The absence of an arrow indicates that the intruder is not changing altitude at a rate greater than 500 feet per minute.

Display 10 includes several areas represented by rectangular boxes 26, 28, 30, 32, 34 which are areas reserved for word displays wherein conditions of the TCAS are reported to the pilot of the host aircraft. For example, if a portion or component of the TCAS fails, a concise textual report describing the failure appears in one of rectangular boxes 26, 28, 30, 32, 34. In another example, if the operator operates mode control 36 to select one of a limited number of operational modes, a concise textual message indicating the choice of operational mode appears in another of rectangular boxes 26, 28, 30, 32, 34. Selectable operational modes typically include a "standby" mode in which both of the host aircraft transponder systems are inactive, a "transponder on" mode in which a selected one of primary transponder and secondary transponder is active, a "traffic alert" mode in which an alert is transmitted to the host aircraft pilot if any Mode-C or Mode-S transponder equipped aircraft are entering a first predetermined cautionary envelope of airspace, and a "traffic alert/resolution advisory" mode in which a traffic alert (TA) and/or resolution advisory (RA) is issued if any Mode-C or Mode-S transponder equipped aircraft are entering a second predetermined warning envelope of airspace. The various operational modes described above are selectable by operating mode control 36.

The Vertical Speed Indicator (VSI) portion of indicator display 10, formed by the semi circular indicia 16 around the periphery and rotatable pointer 18, are used in the TCAS to indicate a rate of climb or descent that will maintain the safety of the host aircraft. In the particular example of FIG. 2, a colored arc portion 40, referenced by double cross-hatching, of the VSI scale indicates a recommended rate of climb intended to ensure the safety of the host aircraft. Another colored arc portion 42, referenced by single cross-hatching, of the VSI scale indicates a rate of descent which the TCAS recommends against for the host aircraft in the current situation. The operator of the intruder aircraft receives instructions coordinated with the host aircraft TCAS.

The TCAS and Mode-S sensor and datalink technologies described above enable displays to provide information both internal and external to the aircraft. Such enhancements to pilot situation awareness are normally expected to provide the pilot with better situation awareness which should serve as a basis for more accurate decisions.

While TCAS represents one known system for predicting airborne collisions, other predictive systems are also known. For example, U.S. Pat. No. 5,325,302, entitled *GPS-BASED ANTI-COLLISION WARNING SYSTEM*, issued to Izidon, et al on Jun 28, 1994, the complete disclosure of which is incorporated herein by reference, describes a method for predicting a collision between two or more relatively moving aircraft, including determining a respective position in space for each one of the aircraft relative to a fixed frame of reference at a predetermined frequency to produce successive frames of positional data for each aircraft with a coupled memory for storing the successive positional data frames, computing a trajectory for each aircraft relative to the fixed frame of reference, and predicting whether two or more trajectories will intersect.

Currently, vertical maneuver information to avoid collision with an intruder aircraft is provided either on an Attitude Direction Indicator (ADI) of an Electronic Flight Instrument System (EFIS) or via rate of climb information on a VSI portion of indicator display 10 (shown in FIG. 2). However, TCAS and other known systems for predicting airborne collisions allow aircraft to approach one another to within as little as 35 seconds or less of a potential collision before collision avoidance maneuver information is displayed to the host aircraft flight crew.

Thus, while TCAS and other ways to predict collisions are known, none provides a practical method and apparatus for effectively predicting and displaying long-range collision information. As aircraft maneuver to avoid weather and terrain, they are often funneled into the same segment of airspace. This is especially so in regions with vertical terrain development, which is also conducive to dangerous convective weather development.

Therefore, long-range detection and management of potential collisions would be highly beneficial to flight crews attempting to coordinate their maneuvers with other aircraft in uncontrolled airspace. Furthermore, present visual flight displays fail to include visual representation of vertical separation. Therefore, vertical profile display of traffic data, in contrast to the current horizontal profile displays, would also be of great value for long-range detection and management of potential collisions.

FIG. 3 illustrates the vertical profiling currently used in various ground proximity warning devices and weather radar systems to provide the flight crew with the entire weather situation along the intended direction of flight. FIG. 3 illustrates a relatively large angle vertical profile scan 50 developed along the flight path as provided by a commercial weather radar system available from Honeywell International, Incorporated of Morristown, N.J. In contrast, other weather radar systems provide the conventional azimuth scan 52. However, although vertical profile scan 50 provides a vertical view 54 of the situation ahead of the aircraft 100 in contrast to the conventional horizontal view 56 provided by other radar systems, vertical view 54 is a planar view showing conditions within a narrow vertical slice of the flying space directly ahead of the host aircraft 100. An Enhanced Ground Proximity Warning System (not shown) also commercially available from Honeywell International, Incorporated, also provides a vertical view (not shown) that is a planar view showing the situation ahead of aircraft 100. However, these 2-dimensional vertical planar views are not currently capable of showing traffic information, except as exists within the vertical plane of interest. Thus, the traditional horizontal traffic information is omitted from current 2-dimensional vertical profile views while ground proximity or weather radar information are displayed.

Therefore, a means for reducing 3-dimensional traffic data into a 2-dimensional vertical profile view and displaying the situational awareness information in a 2-dimensional display is desirable.

SUMMARY OF THE INVENTION

The present invention overcomes the limitations of the prior art by providing a method and device for reducing 3-dimensional traffic data into a 2-dimensional vertical profile view and displaying the situational awareness information in a 2-dimensional display. According to one aspect of the invention, conventional horizontal display symbology and processes are utilized, thereby maximizing commonality and avoiding costly retraining of flight crews to interpret data in a new fashion. Furthermore, the method and circuit of the present invention are applicable to TCAS or ACAS (Airborne Collision Avoidance System) and to all aerial traffic detection and collision avoidance systems.

Vertical profiling allows flight crews to plan and coordinate maneuvers relative to other aircraft, weather, and terrain. Vertical profiling is especially useful in regions with vertical terrain development, which also is conducive to convective weather development. As aircraft maneuver to avoid the weather and terrain, they are often funneled into the same segment of airspace. The vertical profile depictions of the invention enable flight crews to more effectively and safely interpret traffic data.

The vertical profile traffic data depictions of the invention are also of great value for long-range detection and management of potential collisions. The vertical profile depictions of the invention enable flight crews to coordinate their maneuvers with other aircraft in uncontrolled airspace, often while still more than 100 miles apart. By coordinating actions at such great distances, flight crews are provided ample time to ensure that their actions maintain minimum separation. Thus, when implemented in a TCAS, the long-range vertical profile traffic data of the invention provide a strategic traffic avoidance tool in contrast to the tactical information provided by conventional systems. The information provided by the invention allows he flight crew to develop a planned response to traffic information in advance of a collision situation simply by slight speed adjustments and/or course alternations, in contrast to the immediate responses required by a TCAS traffic alert (TA) or resolution advisory (RA). Safety is enhanced because collision situations are avoided at distances well beyond the traditional TA and RA thresholds. Furthermore, fuel savings and passenger comfort are enhanced when the flight crew can respond to a potential collision situation by throttling back slightly or altering course slightly to avoid a potential collision situation, rather than having to waste fuel and disturb passengers by suddenly performing a climb or descent when a collision situation is encountered.

The method of the present invention is a method for displaying vertical situational awareness information relative to an aircraft hosting equipment implementing the method, the method includes defining a three-dimensional sampling reference frame relative to the host aircraft; defining a vertical sampling volume encompassing a predetermined volume of airspace; applying the vertical sampling volume to a sampling reference frame defined relative to the host aircraft; and detecting other aircraft within a predetermined range of the host aircraft. Furthermore, the method of the invention includes determining a position of other aircraft relative to the sampling volume; and, for each of said other aircraft positioned within the sampling volume, displaying in a two-dimensional vertical profile view a symbol representing a three-dimensional position of the other aircraft. Preferably, the position information of the other aircraft includes range and altitude information relative to the host aircraft.

According to one aspect of the invention, the symbol representing a 3-dimensional position of said other aircraft within said sampling volume further is displayed in a 2-dimensional position that is clearly and unambiguously representative of the 3-dimensional position of the other aircraft relative to the host aircraft.

According to another aspect of the invention, the method of the invention includes determining a potential conflict with one or more of the other aircraft. Preferably, when such a potential conflict is determined, the symbol representing a 3-dimensional position of the other aircraft is highlighted. Such highlighting is accomplished, for example, by any of: changing the color of the symbol representing the intruder aircraft, changing the shape of the symbol, periodically highlighting the symbol by "flashing" the symbol, framing or "outlining" the symbol, and displaying the symbol within a conflict range box displayed at an estimated range of the potential conflict.

According to still another aspect of the invention, the invention determines potential conflicts with other aircraft positioned within the sampling volume and/or other aircraft positioned outside of the sampling volume.

According to yet another aspect of the invention, the method of the invention also displays a maneuver useful for avoiding the potential conflict. For example, the pilot is directed change speed or obtain a safe altitude separation by descending, ascending or maintaining current altitude.

According to other aspects of the invention, potential conflicts with other aircraft are determined relative to the current track or the planned flight path of another aircraft. Preferably, the potential conflict is also determined relative to either the current track or the planned flight path of the host aircraft.

According to still other aspects of the invention, the method of the invention is implemented in an electronic circuit having a memory for storing multiple machine instructions and a processor coupled to the memory and executing the machine instructions to implement multiple functions of the invention. According to various aspects of the invention, the functions include: accessing a signal processed as situational awareness information relative to the host aircraft; defining the situational awareness information relative to a vertical sampling volume defined relative to the host aircraft; transposing the situational awareness information into a vertical profile view relative to the vertical sampling volume; and generating a video signal of the vertical profile view of the situational awareness information.

According to one aspect of the invention, the situational awareness information includes position information of other aircraft relative to the host aircraft, and further includes potential conflict information.

According to another aspect of the invention, the functions executed by the circuit of the invention also include a function determining conflict solution information relative to such potential conflicts. Preferably, the video signal generated by the circuit also includes such conflict solution information.

According to yet anther aspect of the invention, the circuit of the invention includes a display adapted to receive the video signal and able to generate a 2-dimensional display of the situational awareness information.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a method for displaying a vertical profile of advanced long-range TCAS information and a device embodying the method.

Figure 2:
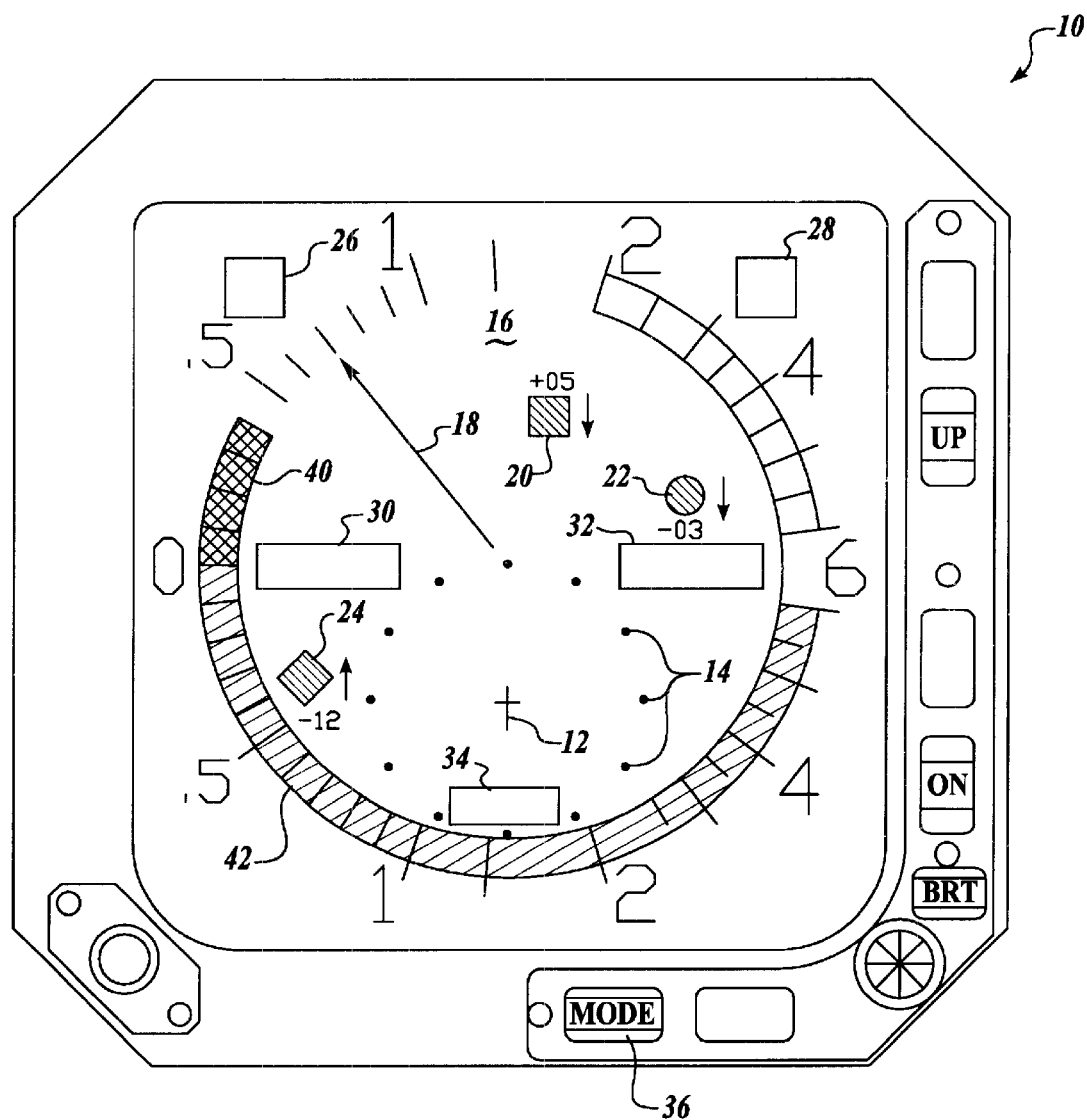
FIG. 2 shows one configuration of a prior art display used with the Traffic Alert and Collision Avoidance (TCAS) system.
Figure 3:
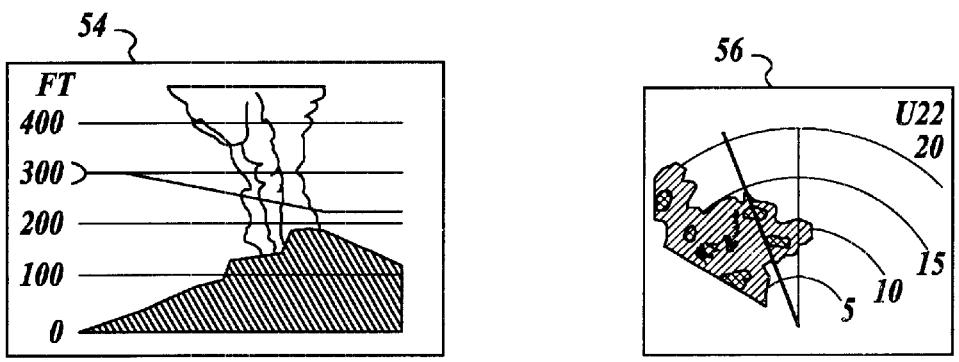
FIG. 3 illustrates a vertical profile scan developed along the host aircraft flight path, as provided by one known commercial weather radar system, contrasted with the conventional azimuth scan provided by other weather radar systems.
Figure 3:
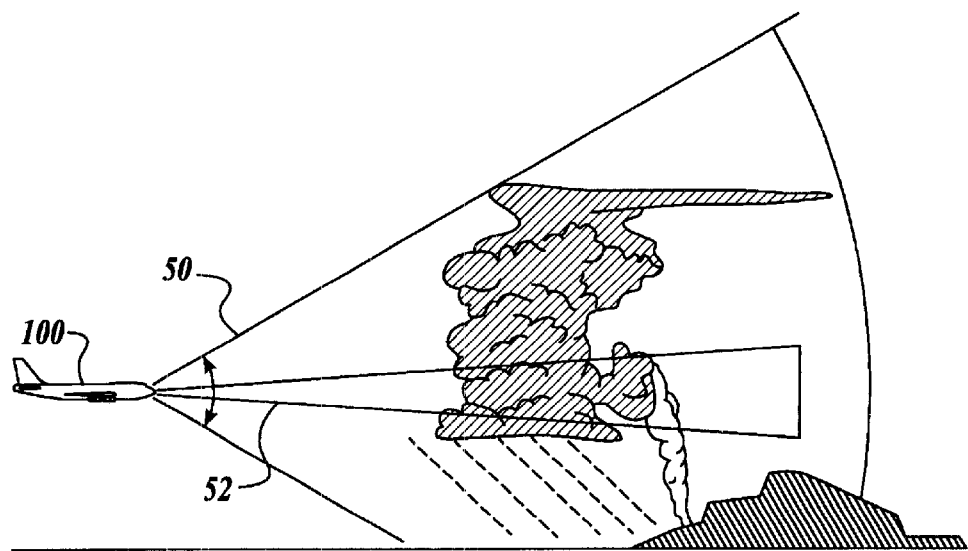
Figure 4:
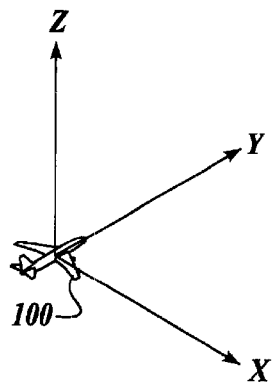
FIG. 4 illustrates three mutually orthogonal coordinate axes as defined by the present invention.

FIG. 4 illustrates three mutually orthogonal coordinate axes as defined by the present invention. The three coordinate axes are defined with "X" perpendicular to the host aircraft's flight path, "Y" stretching ahead of the host aircraft 100, and positive "Z" pointing upwardly away from the earth. Reference to the coordinate axes of FIG. 4 illustrates that current TCAS traffic representations depict horizontal situational representations of traffic in the X-Y plane, as shown in FIG. 2. The "vertical profile" depictions of traffic according to the invention requires a 3-dimensional "vertical sample" of space oriented in the vertical Y-Z plane, and representation of the vertical sample to the pilots.

Figure 5:
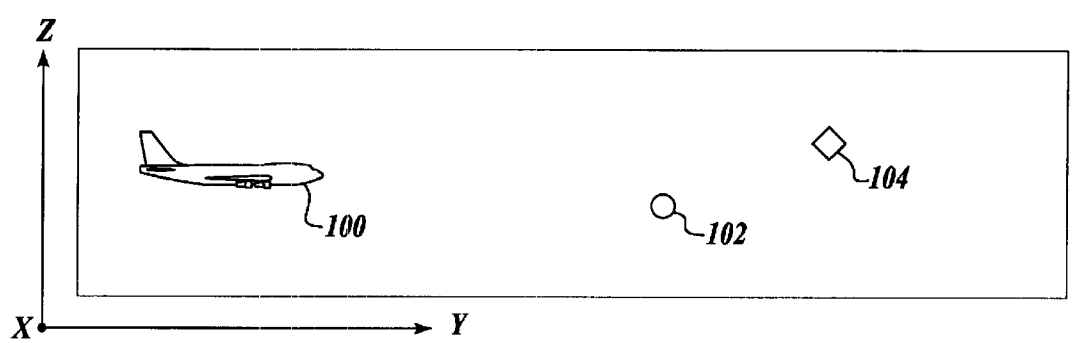
FIG. 5 illustrates one representation of the vertically oriented sample according to one embodiment of the present invention.

FIG. 5 illustrates one representation of the vertically-oriented, 3-dimensional sample, which is discussed in detail below. An assumption of the traditional horizontal representation (shown in FIG. 2) is that many aircraft are being flown in level horizontal planes. Such an assumption makes interpretation of current horizontal traffic data by pilots essentially intuitive. In contrast, according to vertical profile traffic representations, the probability of an intruding aircraft being exactly on a given vertical plane (Y-Z) is quite small. The present invention accounts for this low probability of finding an intruder in any given vertical plane by incorporating into the representation of vertical profile traffic data a 3-dimensional sampling volume that is depicted as compressed into a vertical plane. As such, intruder aircraft lying within the 3-dimensional sampling volume but outside the particular vertical plane of host aircraft 100 are represented as lying within that plane, as shown by intruder aircraft tags circle 102 and diamond 104. Preferably, commonality with current TCAS systems is maximized, thereby avoiding retraining of flight crews to learn to interpret data in a new fashion. Therefore, the invention preferably uses current TCAS symbology to represent an intruder. Accordingly, similar to circle 22 (shown in FIG. 2), circle 102 colored amber represents an intruder entering the alert zone and suggests a moderate threat to host aircraft 100 recommending preparation for intruder avoidance. Diamond 104, similar to diamond 24 (shown in FIG. 2) represents near or "proximate traffic" when colored solid blue or white and represents more remote traffic or "other traffic" when represented as an open blue or white diamond. Air traffic represented by either solid or open diamond 104 is again "on file" and being tracked by the TCAS.

Vertical Sample Volumes

Figure 6A:
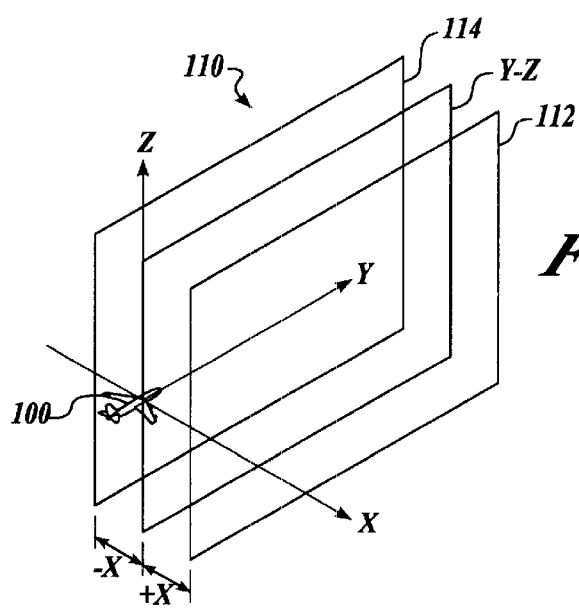
FIG. 6A illustrates a vertical sample volume according to one embodiment of the present invention that describes a "slice" of space between two vertical planes extending parallel to and spaced away from the flight path of the host aircraft.
Figure 6B:
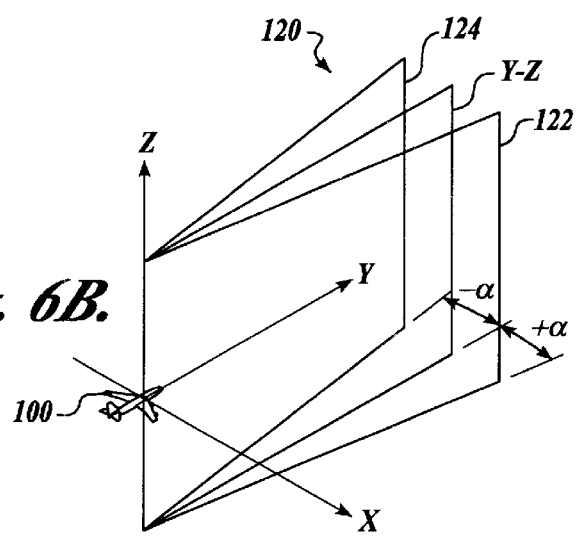
FIG. 6B illustrates another vertical sample volume according to one embodiment of the present invention that describes a "wedge" of space extending in an arc centered on the flight path of the host aircraft and formed of vertical planes diverging radially from the host aircraft outwardly along the flight path of the host aircraft toward infinity.
Figure 6C:
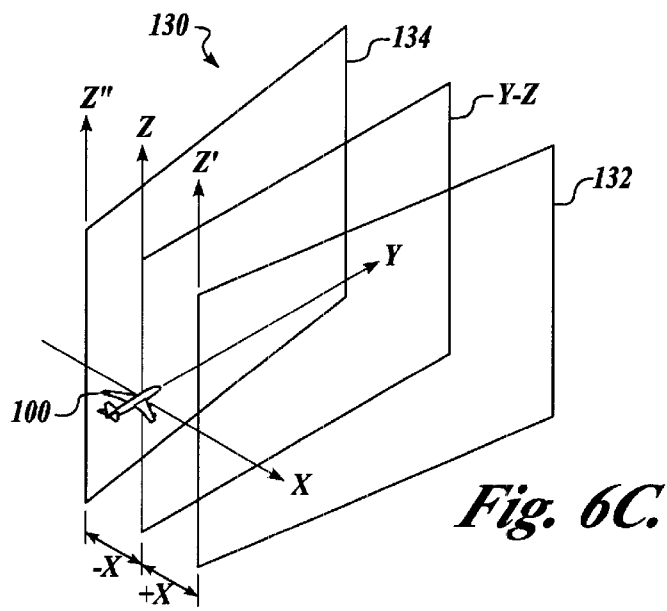
FIG. 6C illustrates still another vertical sample volume that describes a hybrid of the "slice" and "wedge" described in FIGS. 6A and 6B, respectively, in which an angular wedge of space is added to the sides of a slice.

FIGS. 6A, 6B and 6C disclose various different 3-dimensional vertical sample-generating methods. The sample-generating methods disclosed herein are intended merely as examples and are not intended to in any way limit the scope of the invention. The invention recognizes that many other sample-generating methods are within the ability of one of ordinary skill in the art to produce, and all such methods are considered to be within the scope of the present invention. Furthermore, hybrids and combinations of the various sample-generating methods are similarly within the ability of one of ordinary skill in the art to produce and are considered to be within the scope of the invention.

FIGS. 6A and 6B graphically describe two sample-generating methods for use in the invention. FIG. 6A depicts a vertical sample volume 110 that describes a "slice" defining a 3-dimensional area between two vertical planes 112 and 114 parallel to the Y-Z plane defined by host aircraft 100, one each spaced a predetermined respective positive +X and negative −X distance away from plane Y-Z along the X-axis. According to the "slice" method, any aircraft positioned within the constant positive and negative lateral separation along the X-axis from vertical plane Y-Z defined by host aircraft 100 and its flight path is considered to be "in" plane Y-Z and is displayed to the flight crew. The lateral separation value X is optionally either a value selectable by the operator or a preset value. A preset value is, for example, either constant or variable as a predetermined function of the speed and/or body type of host aircraft 100.

FIG. 6B depicts a vertical sample volume 120 that describes a 3-dimensional "wedge" defined by an arc formed of vertical planes 122 and 124 diverging radially from host aircraft 100 outwardly toward infinity. The arc is centered on the Y-Z plane defined by host aircraft 100. In other words, vertical planes 122 and 124 are each rotated essentially equal respective positive (+α) and negative (−α) angles. The width of the subtended section is preferably a function of the forward velocity of host aircraft 100. Divergence angle a is optionally either a value selectable by the operator or a preset value. A preset value is, for example, either constant or variable as a predetermined function of the speed and/or body type of host aircraft 100.

FIG. 6C depicts one 3-dimensional vertical sample volume 130 that describes a hybrid of slice 110 and wedge 120, which is also for use in the present invention. Hybrid vertical sample volume 130 is defined by an angular wedge (as shown in FIG. 6A) added to the sides of a slice (as shown in FIG. 6B). Thus, vertical planes 132 and 134 diverge radially from vertical axes Z' and Z" located respective predetermined distances +X and −X along the X-axis from host aircraft 100 and extend outwardly ahead of aircraft 100 toward infinity.

Another way (not shown) of visualizing hybrid vertical sample volume 130 is as an angular wedge having vertical planes 132 and 134 diverging radially from a vertical axis located a predetermined distance behind host aircraft 100 and extending outwardly ahead of aircraft 100 toward infinity.

Defined slice 110, wedge 120 and hybrid 130 vertical sample volumes (shown in FIGS. 6A, 6B and 6C, respectively, each allows a pilot to "see" intruders that might cross in front of host aircraft 100. Additionally, the vertical sample volumes clearly define any of slice 110, wedge 120 and hybrid 130, or another suitable vertical sample volume each provide information that enables a pilot to extrapolate to the real outside world the information shown on the cockpit display.

Understanding of the size and shape of the sampling volume permits the pilot to reasonably interpret the location of the intruder as being in a position that can be estimated within useful limits at a horizontal distance along the Y-axis, i.e., in front of host aircraft 100; a vertical distance along the Z-axis, i.e., above or below host aircraft 100; and a horizontal distance along the X-axis, i.e., within a certain distance either side of the current velocity vector or the planned flight path. Thus, the sampling volume is a subset of all the intruders detected and tracked by the collision avoidance system.

Sampling Reference Frame

According to the invention, the sampling volumes defined above, for example, slice 110, wedge 120 and hybrid vertical sample volume 130, are oriented relative to a known and understood sampling reference frame. Several exemplary sampling reference frames for use with the invention are defined herein relative to various commonly known and understood reference orientations.

Figure 7:
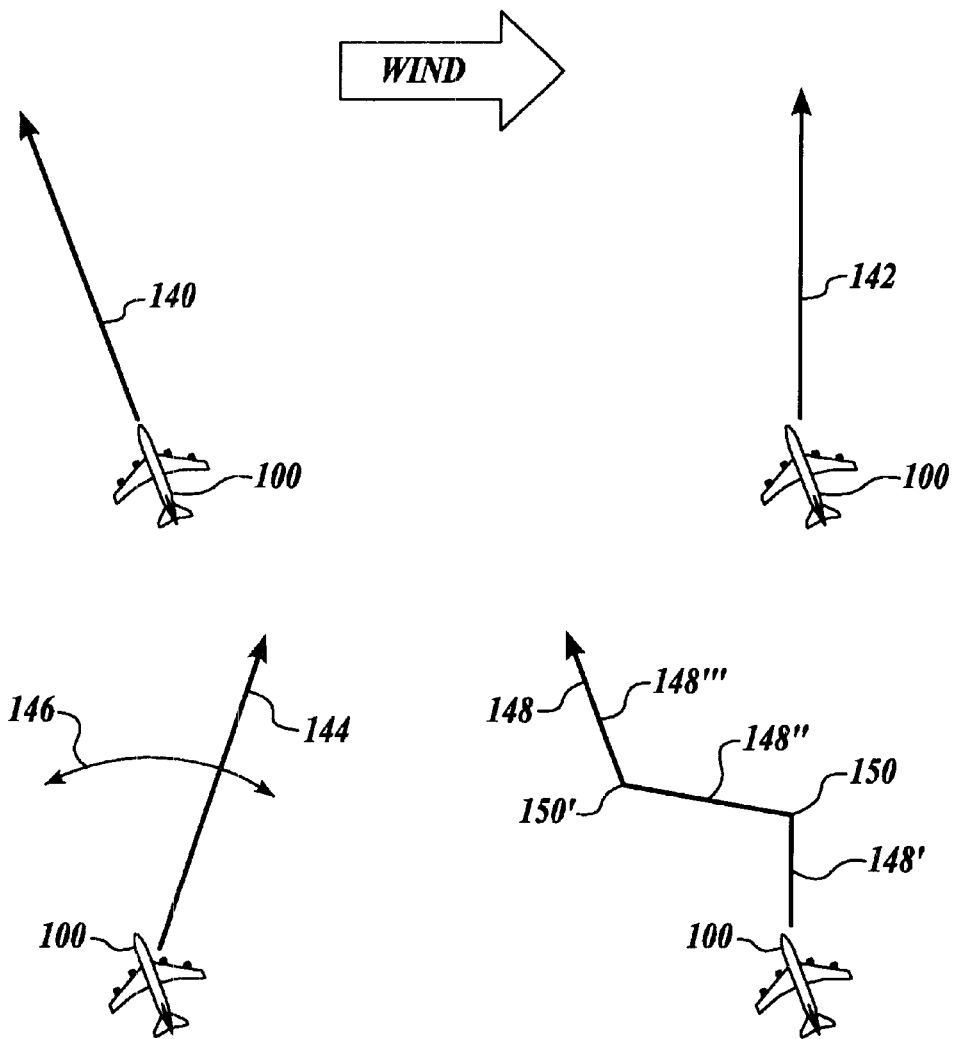
FIG. 7 illustrates exemplary sampling reference frames for use in preferred embodiments of the present invention.

FIG. 7 illustrates the exemplary sampling reference frames for use in preferred embodiments of the present invention. These examples are intended only to illustrate the invention, and are not intended to limit the scope of the invention in any way. In FIG. 7, one exemplary sampling reference frame is "heading." Heading is the direction (represented by arrow 140) that the nose of aircraft 100 currently points. A sampling volume, for example, one of slice 110, wedge 120 and hybrid vertical sample volume 130, is aligned along the forwardly extended centerline of aircraft 100, also referred to as Aircraft Data Line (ADL) in the context of radar. Heading is usually available from the onboard Flight Management System (FMS).

Another one of exemplary sampling reference frame shown in FIG. 7 is "track." According to the use of track as a sampling reference frame, the instantaneous velocity vector (represented by arrow 142) of aircraft 100 relative to the ground defines the primary axis of the sampling volume. Instantaneous velocity vector 142 typically differs from heading 140 as the result of drift induced by wind (illustrated as an arrow in FIG. 7). Instantaneous velocity vector 142 is also usually available from the onboard FMS.

Yet another exemplary sampling reference frame shown in FIG. 7 is "slew." As illustrated by directional arrow 144 and rotational arrow 146 in FIG. 7, the slew sampling reference frame is that sampling reference frame that is selectively aligned along any direction to orient the sampling volume without regard to current heading or motion of aircraft 100.

Still another one of one exemplary sampling reference frame shown in FIG. 7 is "course," whereby the sampling volume is matched to the planned flight path of aircraft 100. As illustrated in FIG. 7, the planned flight path 148 may include several segments 148', 148" and 148''' through 148N (not shown) stretching between sequential way points 150, 150' through 150N (not shown), each having a different planned heading or track over the ground. Course information is also usually available from the onboard FMS.

Those of ordinary skill in the art will recognize that other reference frames than those defined herein are also useful in practicing the present invention; those other reference frames are similarly intended to lie within the scope of the invention. Furthermore, according to the present invention, any of the above described vertical sampling volumes is applied to any of these reference frames, whereby the sampling frame is oriented according to the reference frame.

Figure 8:
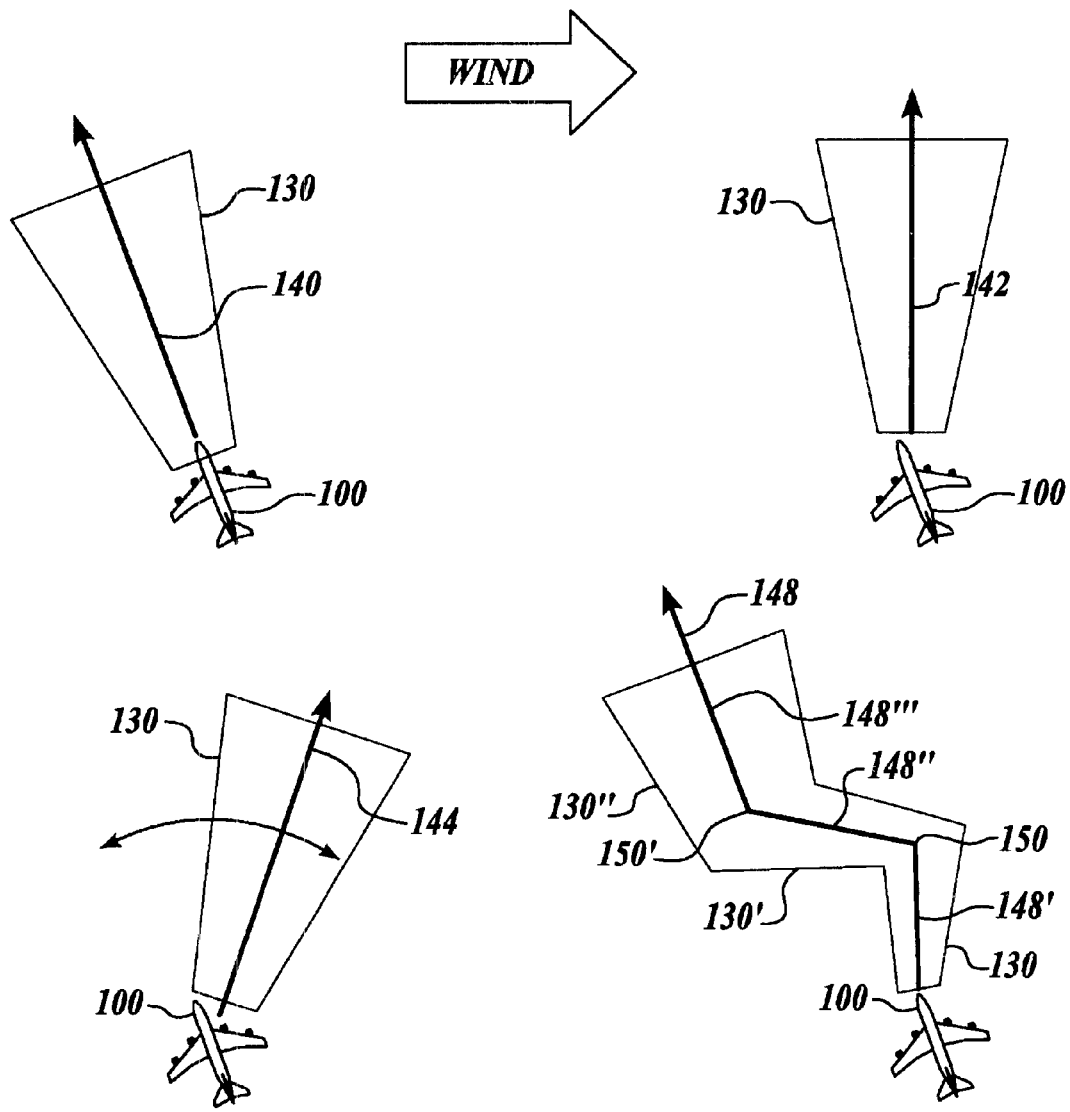
FIG. 8 illustrates application of the vertical sampling volume shown in FIG. 6 to the exemplary sampling reference frames shown in FIG. 7.

FIG. 8 illustrates application of hybrid sampling volume 130 to the exemplary sampling reference frames described above and shown in FIG. 7. FIG. 8 illustrates the orienting and conforming of hybrid sampling volume 130 to the various sampling reference frames. By application of 3-dimensional hybrid sampling volume 130 to any of heading 140, track 142, slew 144, course 148, and another suitable reference frame (not shown), the present invention generates a display of the position of any intruder (not shown) within hybrid sampling volume 130. Any intruders' positions within the sampling volume is displayed to the flight crew on a 2-dimensional display.

Furthermore, one of the above defined 3-dimensional sampling volumes, for example, slice 110, wedge 120 and hybrid vertical sample volume 130, is alternatively applied to the planned flight path of host aircraft 100, and oriented relative to the selected reference frame. The flight crew is thereby provided with advance traffic information for a distance along the planned flight path, rather than a more limited or unnecessarily enlarged airspace. In FIG. 8, hybrid sampling volume 130 is applied to each segment 148' through 148N (not shown), collectively the planned flight path 148 of host aircraft 100. A series of consecutive vertical sampling volumes 130, 130', 130" through 130N (not shown) are formed as a function of the planned flight path. As shown in FIG. 8, the vertical planes 132 and 134 (shown in FIG. 6C) forming the "wedge" portion of each successive one of hybrid sampling volumes 130' through 130N diverge from vertical axes defined by the diverging vertical planes of the previous hybrid sampling volume 130 near a waypoint 150 through 15N ending a respective course segment 148' through 148N. Thus, the sampling volume included in each successive one of hybrid sampling volumes 130' through 130N is enlarged relative to previous hybrid sampling volumes 130.

Traffic Information Display

Figure 9A:
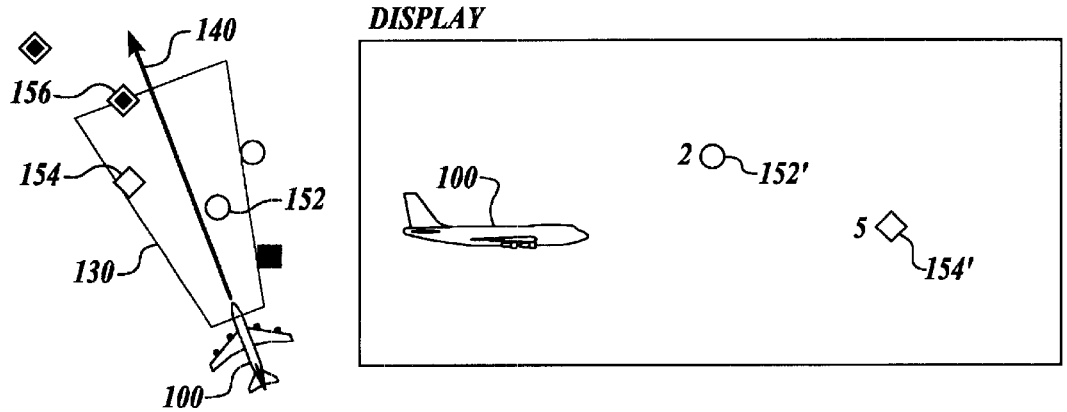
FIGS. 9A and 9B illustrate examples of how intruders are displayed to the flight crew based on the selected sampling volume and selected sampling orientation.

FIG. 9 illustrates two examples of how intruders are displayed to the flight crew based on the sampling volume and sampling orientation selected. When viewed from above looking down on aircraft 100 in FIG. 9A, the horizontal positions of intruders relative to aircraft 100 are clearly evident given current traffic display symbology and interpretation. For example, when hybrid vertical sampling volume 130 is oriented according to heading 140, intruders represented by circle indicia 152 and diamond indicia 154 lie within hybrid vertical sampling volume 130. Another intruder represented by diamond 156 is near entering the maximum range of hybrid vertical sampling volume 130. The 3-dimensional spatial position data of each intruder relative to host aircraft 100 is mathematically transposed by the invention using known conversion techniques to a vertical profile display to illustrate the relative vertical orientations of intruders represented by circle indicia 152' and diamond indicia 154'. As illustrated in FIG. 9A, the relative lateral intruder positions are no longer clearly evident in the vertical profile display, but the vertical positions are illustrated more clearly and unambiguously.

Figure 9B:
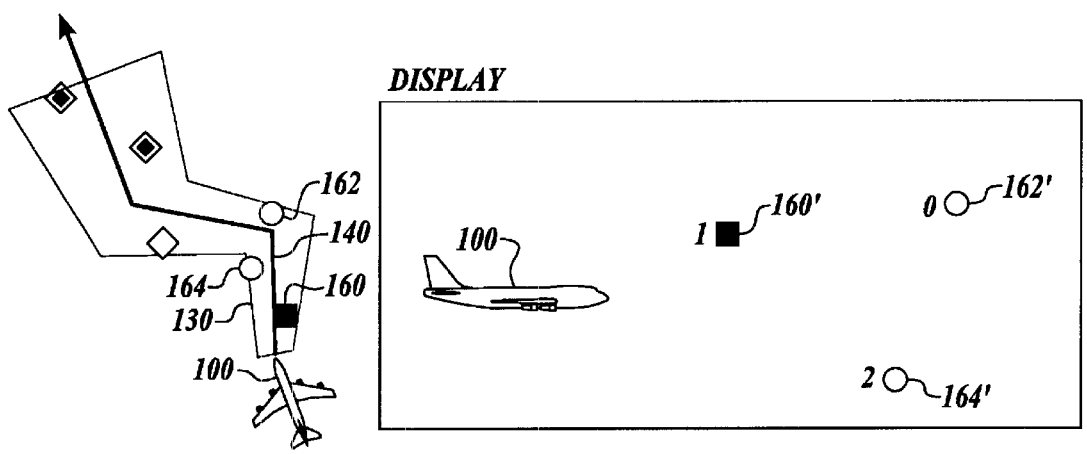

Similarly, the downwardly looking view in FIG. 9B clearly shows the horizontal position of intruders 160, 162, and 164 relative to host aircraft 100 using current traffic display symbology and interpretation. When intruders 160, 162, and 164 are within hybrid vertical sampling volume 130 (as shown), each intruder's position data relative to aircraft 100 is transposed by the invention from a 3-dimensional frame of reference to a vertical frame of reference and displayed on a vertical profile display to illustrate the relative vertical orientations of each intruder 160', 162', and 164'. As illustrated in FIG. 9B, relative lateral intruder positions are no longer clearly evident, but vertical positions are clearly and unambiguously illustrated.

As discussed above, horizontal depictions of traffic used in conventional TCAS show relative positions projected into the horizontal X-Y plane passing through host aircraft 100 (shown in FIG. 4). In conventional TCAS displays, an intruder's relative distance above or below the X-Y plane through host aircraft 100 is typically described using a number that indicates the distance from the X-Y plane in hundreds of feet, with the convention that intruders above the X-Y plane are displayed as positive distances, while intruders below are characterized with negative relative elevations. Additionally, when positioned below the elevation of host aircraft 100, the intruder's relative altitude value is displayed under the icon, while the relative altitudes of traffic positioned above host aircraft 100 are displayed above the icon.

As mentioned above, while other symbology is alternately used in the invention, the present invention preferably draws on existing horizontal traffic symbology and display processes to maximize commonality with conventional TCAS displays. Flight crew retraining to learn to interpret data in a new fashion is thereby avoided. Therefore, in a preferred embodiment of the invention, analogous symbology and display processes are used to display the vertical profile traffic information. In the vertical profile of the invention, intruders within the sampling volume are preferably projected onto the vertical Y-Z plane. Each intruder's distance from the centerline of the 3-dimensional, vertically-oriented sampling volume, i.e., lateral separation from the heading 142, track 144, slew 144, or course 148 of host aircraft 100 (shown in FIGS. 7, 8), is indicated with the lateral separation value being displayed near the intruder icon. The lateral separation value being indicated, for example, in tenths of a mile. Alternatively, the intruder's lateral separation value is indicated in 100 foot increments, 1 nautical mile increments, or another useful unit of distance.

According to another alternative embodiment of the invention, the units for lateral separation are either operator selectable or a function of separation between the vertical planes bounding the sampling volume (shown in FIG. 6). For example, in FIGS. 9A and 9B, each intruder's distance from the centerline of the sampling volume is indicated as a textual message displayed beside the corresponding intruder icon.

Figure 10A:
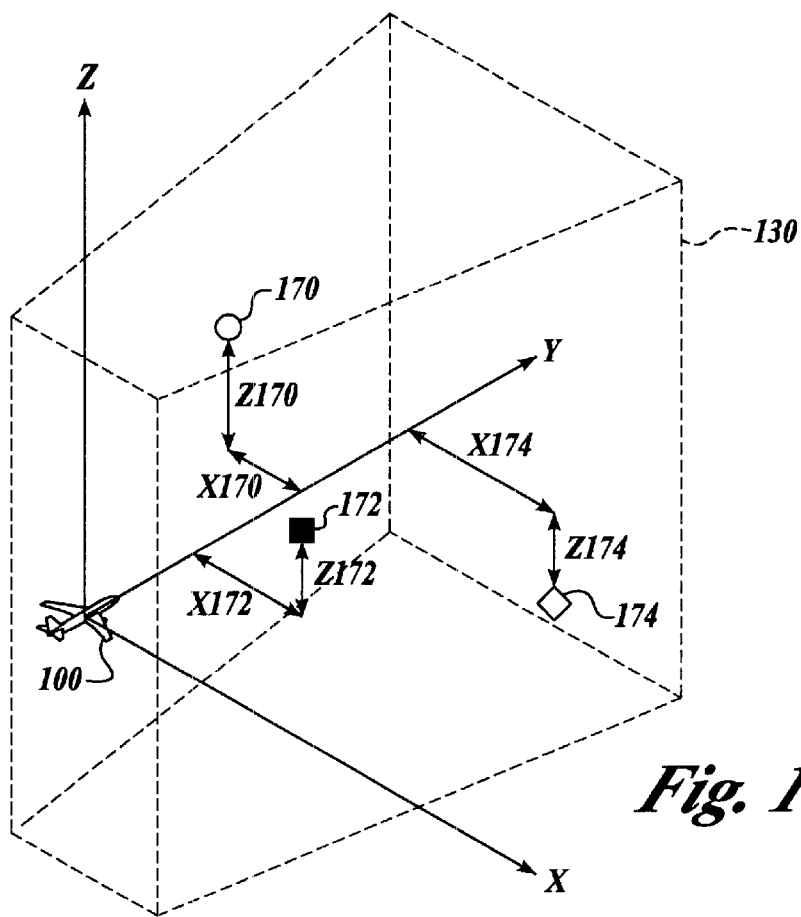
FIGS. 10A and 10B respectively illustrate the spatial positions of each of three exemplary intruders relative to the host aircraft and transposition of the situational awareness information into a two-dimensional vertical profile view.
Figure 10B:
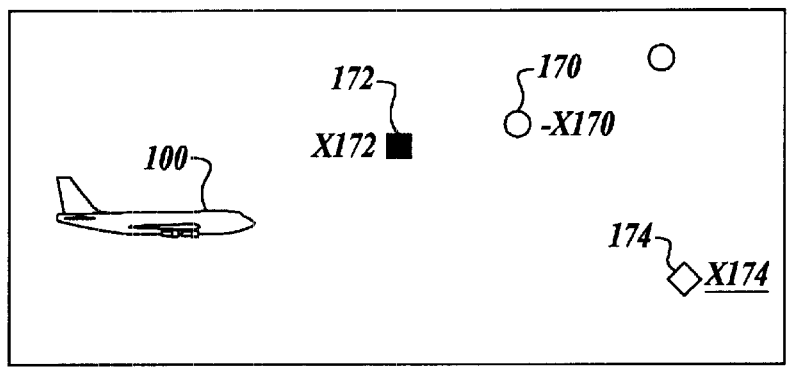

FIG. 10 illustrates the 3-dimensional spatial positions of each of three exemplary intruders relative to host aircraft 100. As described above and in FIG. 2, positive and negative values are assigned to relative vertical positions in conventional horizontal displays. Analogously, in the vertical profile display of the present invention, positive and negative values are assigned to horizontal positions right or left of the vertical Y-Z plane (shown in FIG. 6) defined by the sampling reference frame. In FIG. 10A, three intruders, represented by circle 170, square 172, and diamond 174, are positioned within hybrid sampling volume 130 extending ahead of host aircraft 100 along a vertical Y-Z plane defined by a suitable reference frame, such as one of the reference frames described in FIG. 7.

In FIG. 10, each of intruders 170, 172, and 174 are positioned above or below host aircraft 100 and are also spaced horizontally on one or the other side of vertical plane Y-Z. Intruder 170, for example, is positioned above and to the left of vertical plane Y-Z, i.e., to the port side of host aircraft 100. Intruders 172 and 174 are positioned above and below, respectively, and to the right of vertical plane Y-Z, on the starboard side of host aircraft 100. Each intruder 170, 172, and 174 is offset from vertical plane Y-Z by a respective distance X170, X172, and X174, and offset from the horizontal plane X-Y by a respective distance Z170, Z172, and Z174. Accordingly, in the vertical display illustrated in FIG. 10, the vertical offsets Z170, Z172, and Z174 are indicated graphically by the placement of each icon 170, 172, and 174 along the Z-axis relative to the icon representing host aircraft 100. The respective offset distances of each intruder 170, 172, and 174 in front of host aircraft 100 is depicted graphically by the relative Y-axis placement of the respective icons. The horizontal offset of each intruder is indicated by a value placed on either the right or left of corresponding icon 170, 172, and 174. The position of intruder 170 is, for example, offset a distance –X170 or a distance X170 to the left of host aircraft 100. Therefore, incremental lateral separation value, for example, 100 feet, is divided into the lateral separation distance value –X170 and the result is displayed to indicate the lateral separation distance X170. Each of the respective lateral separation distance values X172 and X174 are treated similarly and the values displayed beside corresponding intruder icons 172 and 174.

Additionally, according to preferred embodiments of the invention, the lateral separation value is displayed on the same side of the respective icon as the intruder is relative to the sampling volume centerline, plane Y-Z. As illustrated in FIG. 10, intruder 170 is positioned to the left or port side of plane Y-Z, therefore the lateral separation distance value –X170 is displayed on the left side of icon 170. In contrast, each of intruders 172 and 174 are illustrated on the right or starboard side of plane Y-Z. Therefore, the respective lateral separation distance values X172 and X174 are displayed to the right side of icons 172 and 174 as a function of whether the intruder is on the right or left of the sampling volume centerline, plane Y-Z, i.e., to starboard or port, respectively, of host aircraft 100. Such placement of the lateral separation value relative to the icon is analogous to placement of the vertical separation value above intruder icon 22 or below intruder icons 20 and 34 in conventional horizontal display 10 (shown in FIG. 2).

According to further preferred embodiments of the invention, an intruder aircraft having a crossing velocity greater than a given threshold value is distinguished from other intruders. For example, an intruder having a velocity component perpendicular to the flight path of host aircraft 100 that exceeds 41% of the intruder's total velocity has, by implication, a greater than 45-degree crossing angle. Preferably, the displayed lateral separation distance of an intruder having a crossing velocity greater than a given threshold value, as computed by TCAS processor 4, is underlined or otherwise suitably differentiated from other intruder aircraft. Such a differentiation is illustrated in FIG. 10 by underlining the displayed lateral separation distance X174 of intruder 174.

Long-Range Conflict Resolution

The conventional TCAS alert range, within which any TA or RA (Traffic Alert or Resolution Advisory) is normally detected, is within 45 seconds or less of separation. As noted above, conventional horizontal profile depiction methodology allows aircraft to approach to within 35 seconds or less of a potential collision before avoidance information is displayed to the flight crew. Collision avoidance information currently consists of providing vertical maneuver information to avoid the intruder aircraft. In contrast, the vertical profile information of the present invention is especially valuable for conflict resolution at long-range, i.e., distances beyond the TA and RA threshold, which are generally greater than about 40 nautical miles, and preferably up to at least 100 nautical miles. Therefore, according to preferred embodiments of the invention, the collision avoidance system automatically reverts to the conventional horizontal depiction of traffic and the resolution advisory is displayed when a potential conflict is detected within the conventional TCAS alert range and a Resolution Advisory, or RA, is generated. According to various embodiments of the vertical profile traffic representation invention, potential conflicts beyond the TA and RA threshold are displayed to the flight crew using any of a number of different methods. Such potential conflicts are those situations wherein the intruder aircraft will apparently pass within the TA and/or RA threshold. Preferably, long-range conflict resolution symbology reflects the greater time horizon involved.

Figure 11A:
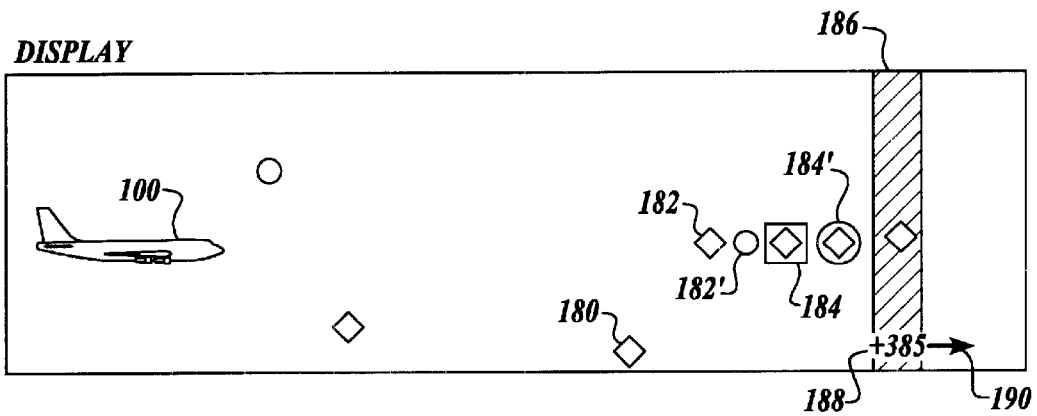
FIGS. 11A and 11B each illustrate exemplary conflict depiction and resolution symbology for use with the present vertical profile traffic representation invention.
Figure 11B:
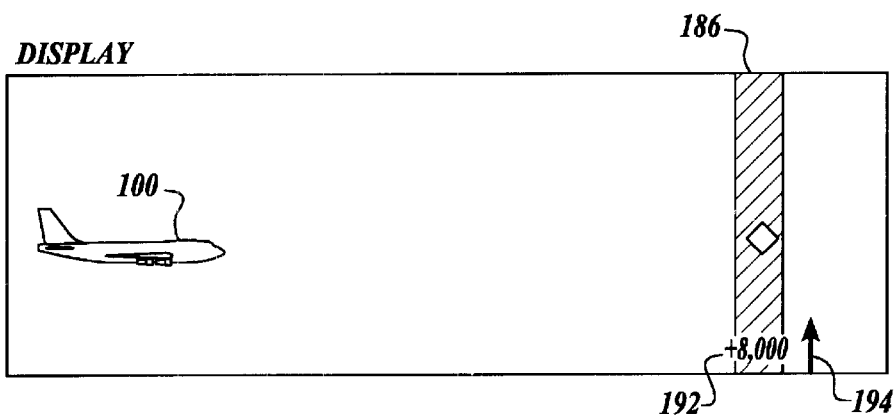

FIGS. 11A and 11B each illustrate exemplary conflict avoidance symbology for use with the present vertical profile traffic representation invention. Other symbology is similarly contemplated, and although perhaps not as familiar to the flight crew trained to use conventional horizontal profile displays, are considered to be within the scope of the invention. For example, as shown in FIG. 11A, given the range and closure of long-range traffic targets having no potential conflicts with host aircraft 100, in accordance with the symbology of conventional horizontal profile displays, these intruders are displayed using the hollow or unfilled white diamond icon 180.

However, conflict avoidance information solutions for determined potential long-term conflicts is displayed using symbology analogous to that used in conventional horizontal profile displays. For example, the means for alerting the flight crew to potential long-term conflicts with the intruder aircraft represented by icon 182 include, but are not be limited to:

1) changing the color (not shown) of icon 182, for example, from white to amber, thereby representing an intruder caution symbol;
2) changing the shape of icon 182, for example, to a circle 182', preferably colored amber (not shown), to represent an intruder representing a moderate threat to host aircraft 100 and recommending preparation for intruder avoidance;
3) blinking or flashing (not shown) icon 182 by displaying icon 182 periodically at a predetermined rate;
4) illuminating icon 182 by enclosing icon 182 within a frame, such as a box 184 or circle 184'; and
5) displaying a "conflict range box" 186 illustrating the region of potential conflict.

Depiction Of Potentially Corrective Action

Depiction of potentially corrective action useful in avoiding the conflict with the intruder aircraft represented by icon 182 is desirable and would be helpful to the flight crew. FIG. 11A additionally depicts potential corrective action for avoiding the potential conflict with intruder 182. For example, conflict avoidance information includes, but is not be limited to, information such as the minimum speed change, either the amount of speed increase or reduction, necessary to pass ahead or behind of intruder aircraft 182; and an altitude change to obtain a safe altitude separation, by descending, ascending or maintaining current altitude, analogously to the collision avoidance maneuvers used in the conventional TCAS Resolution Advisories (RA) for use with conventional horizontal profile displays.

Preferably, such conflict avoidance information is presented to the flight crew textually, graphically, or a combination of both. For example, FIG. 11A further illustrates a command to increase speed to avoid the potential long-range conflict as a combination of a textually displayed desired speed value 188 and a graphically displayed arrow 190. Optionally, a plus sign "+" is displayed in front of desired speed value 188 to indicate an increase in speed from a present speed, while a minus sign "−" is similarly displayed in front of desired speed value 188 to indicate an decrease in speed. Preferably, the placement of arrow 190 on the right of conflict range box 186 indicates an increase in speed, while placement on the left side (not shown) of conflict range box 186 indicates a desired speed reduction. Alternatively, rightwardly pointing arrow 190 indicates an increase in speed, while a leftwardly pointing arrow 190' (not shown) indicates a decrease in speed.

FIG. 11B illustrates another embodiment of the invention, wherein conflict avoidance information is presented to the flight crew using a combination of both text and graphics. In FIG. 11B, the invention generates and displays an instruction to change altitude to avoid the potential long-range conflict as a textually displayed desired altitude value 192. Optionally, a plus sign "+" is displayed in front of desired altitude value 192 to indicate an increase in altitude from a present altitude, while a minus sign "−" is similarly displayed in front of desired altitude value 192 to indicate an decrease in altitude. In other words, desired altitude change value 192 is displayed as a desired change in altitude 192 from a present altitude. A desired altitude 192 is alternatively displayed in incremental values of hundreds of feet. Thus, desired altitude change 192 is alternatively displayed as "+8" to climb an additional eight thousand feet, or "+8.1" to climb an additional eight thousand one hundred feet. Optionally, units signifier is added after the value to avoid confusion. As such, desired altitude change 192 is alternatively displayed as "+8K" or "+8.1K." Alternatively, a desired change in altitude 192' (not shown) from the present altitude of host aircraft 100 is displayed in incremental values of hundreds of feet. Therefore, an increase in altitude of 500 feet is displayed as "+5," while a decrease in altitude of 800 feet is displayed as "−8."

Preferably, textual altitude instruction 192, 192' is accompanied by a graphically displayed arrow 194. Preferably, an upwardly pointing direction of arrow 194 indicates an ascent to accomplish desired altitude change 192, 192', while a downwardly pointing direction of arrow 194 (not shown) indicates a descent. Preferably, the positive and negative convention is carried over to the placement of arrow 192, 192', such that arrow 192, 192' instructing an increase in altitude is displayed on the right or positive side of conflict range box 186, while arrow 192, 192' instructing a decrease in altitude (not shown) is displayed on the left or negative side of conflict range box 186.

Use Of Flight Plan Information To Predict Conflicts

FIG. 12 illustrates the use of flight plans stored in the FMS onboard host aircraft 100 to predict potential conflicts. As is well-known to those of ordinary skill in the art, aircraft carrying an onboard FMS typically develop a time and/or fuel efficient flight path to the destination. The flight path is stored in the onboard FMS, where it is accessed by the autopilot to fly the course segments 148' through 148N (not shown) at a given speed between consecutive waypoints 150, 150' through 150N (not shown), collectively flight path 148.

One exemplary method for detecting potential traffic conflicts using flight plan information includes using one of the above disclosed sampling volumes oriented relative to one of the above disclosed sampling reference frames and applied to the planned flight path of host aircraft 100.

Figure 1:
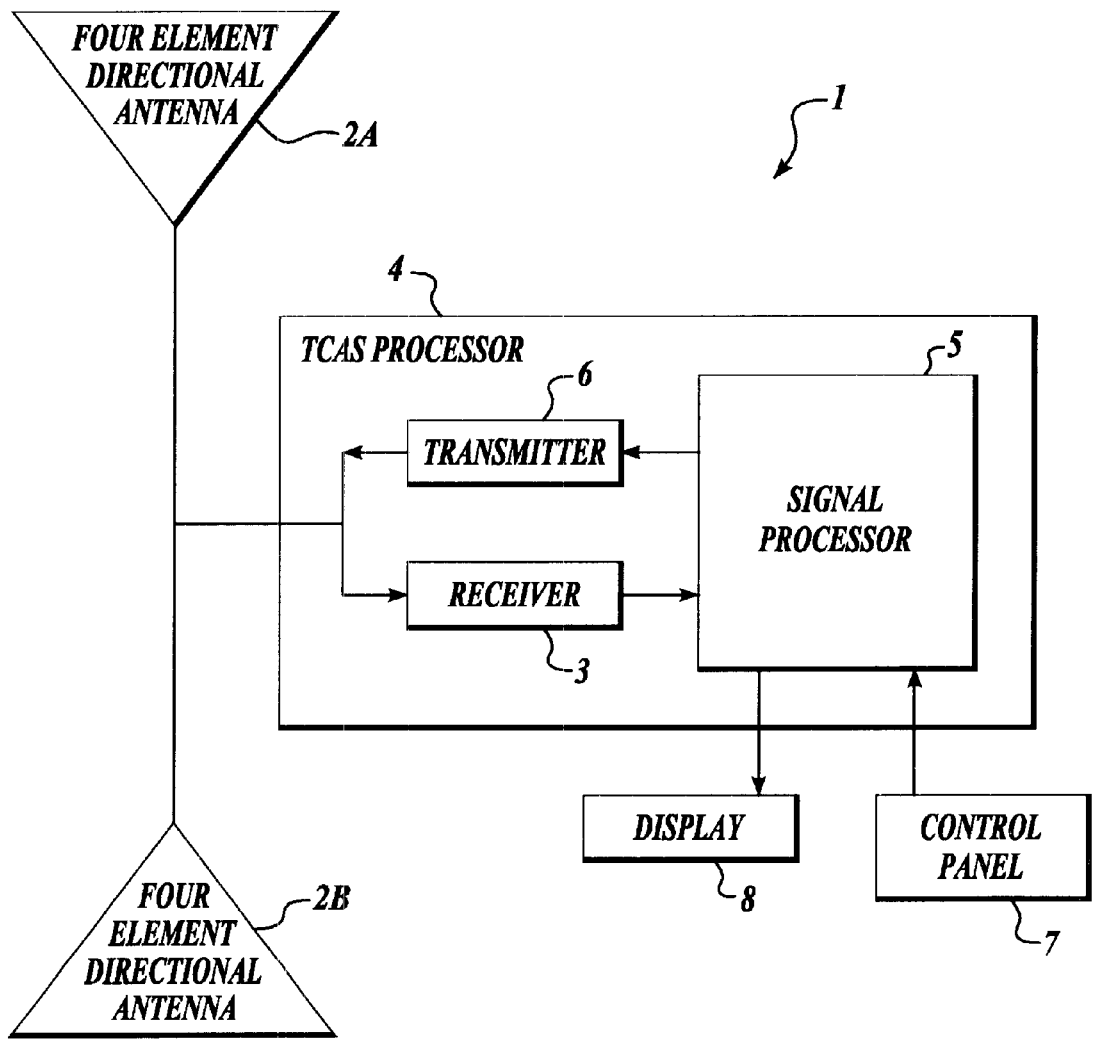
FIG. 1 illustrates one prior art embodiment of the TCAS.
Figure 12A:
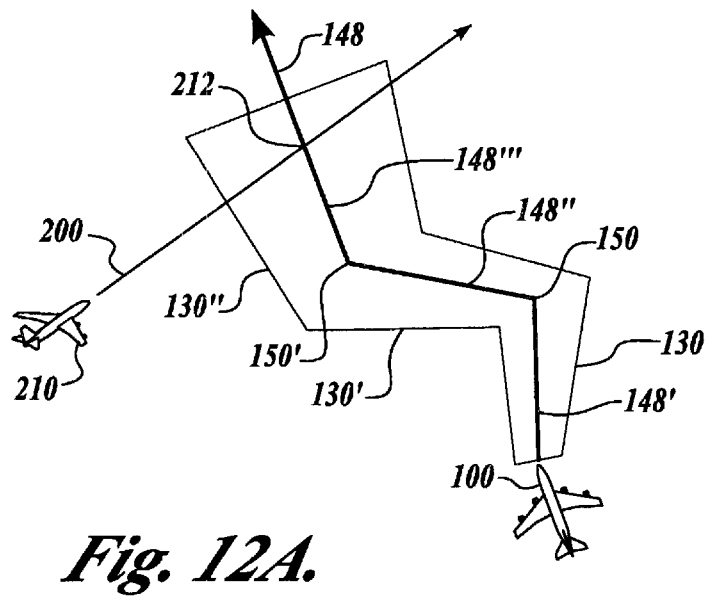
FIG. 12A illustrates the use of flight plans stored in the FMS onboard the host aircraft in combination with a determined track of an intruder aircraft to predict a potential conflict.

In the example illustrated in FIG. 12A, as described above, the hybrid sampling volume 130 is applied to each course segment 148, 148', 148– through 148N of planned flight path 148 of host aircraft 100, as retrieved from previous storage in the flight management computer portion of the onboard FMS. The TCAS processor compares retrieved planned flight path 148 with the flight track 200, including current speed, of detected other aircraft 210, as determined by TCAS processor 4 (shown in FIG. 1). The data, i.e., planned flight path 148 and other aircraft flight track 200, are compared by the invention to detect crossing flight paths. The invention analyzes planned flight path 148, i.e., the planned speed and routing data of host aircraft 100, and flight track 200, i.e., the current speed and track data of other aircraft 210, to determine whether both host aircraft 100 and other aircraft 210 are predicted to be near the crossing point 212 at about the same time. Furthermore, the invention retrieves the planned altitude of host aircraft 100 at predicted crossing point 212 from planned flight path 148, and obtains the current altitude of other aircraft 210 from a received Mode-C reply signal. Optionally, TCAS processor 4 tracks altitude data from sequential or regularly spaced received Mode-C reply signals and computes a predicted altitude for the intruder at the predicted point of potential conflict. The invention determines whether the two aircraft will have the same or near same altitudes at crossing point 212. The invention analyzes the above data to determine if a potential conflict exists. In other words, the invention determines whether the flight paths of the two aircraft intersect at the same altitude, and if so, whether both the intruder and host aircraft expected to be at the crossing point at the same time.

Figure 12B:
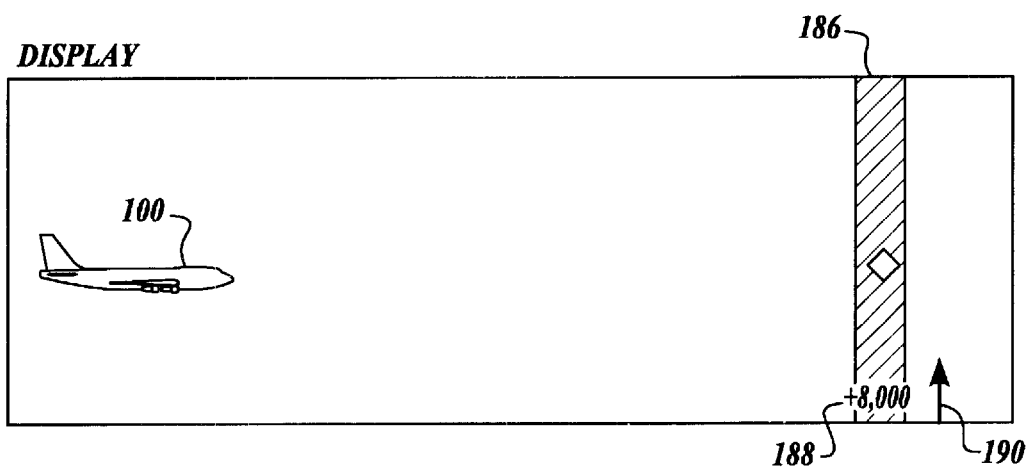
FIG. 12B illustrates the display of potential conflicts on the vertical profile display in the cockpit of the host aircraft using, for example, as a "conflict range box"

FIG. 12B illustrates the display of any potential conflicts on the vertical profile display in the cockpit of host aircraft 100, for example, as a conflict range box 186. Above described conflict avoidance information is preferably also presented to the flight crew on the vertical profile display.

FIG. 12B is also representative of the display of the invention when potential conflicts are determined by analysis of both planned flight path 148 of host aircraft 100 and a determined planned flight path of an other aircraft 220 (shown in FIG. 13), as determined by either Automatic Dependent Surveillance-Broadcast (ADS-B) broadcast or datalink from aircraft 220.

Figure 13:
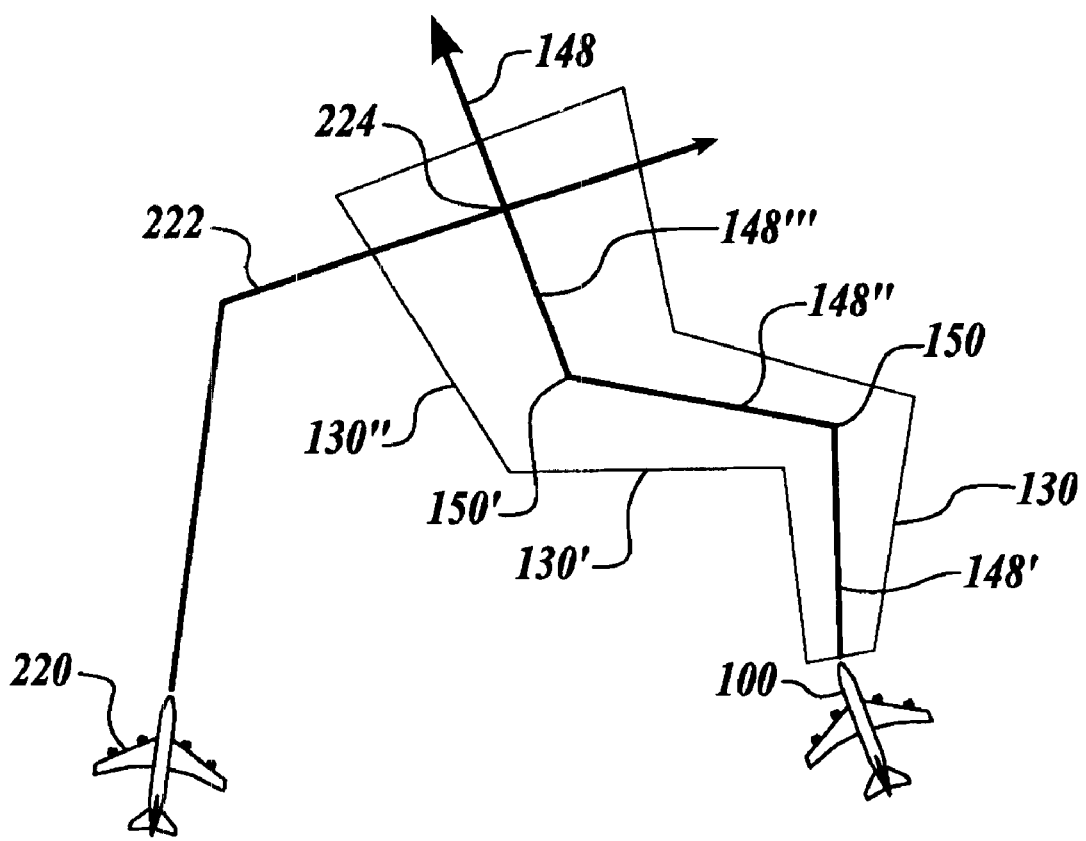
FIG. 13 illustrates the use of flight plans stored in the FMS onboard the host aircraft in combination with the planned flight path of an intruder aircraft to predict a potential conflict.

FIG. 13 illustrates the intersection of planned flight path 148 of host aircraft 100 and the planned flight path of other aircraft 220. Preferably, each aircraft within range is interrogated to determine its planned flight path 222. According to one embodiment of the invention, intruder aircraft 220 is equipped with an Automatic Dependent Surveillance—Broadcast (ADS-B) system, which broadcasts the planned flight path/routing of aircraft 220 among other data via the on-board Mode-S transponder or other on-board transmission equipment. The host aircraft's TCAS decodes the ADS-B broadcast to determine the intruder's planned flight path/routing information and uses this information as the intercepting course information, rather than the instantaneous velocity vector. This method is preferred for its accuracy at ranges of 100 nautical miles and beyond. Alternatively, each intruder aircraft 222 accesses its own onboard FMS to retrieve flight plan information and downloads the information to a requesting host aircraft 100 via datalink. The planned flight path 222 information typically includes planned course, altitude, and speed for each flight path segment. The various data are compared by the invention with flight path 148 of host aircraft 100 to detect crossing flight paths at near altitudes. The invention further analyzes the data to determine whether both aircraft are predicted to pass near crossing point 224 at nearly the same time as a function of flight paths and planned speeds 148 and 222 to determine whether a potential conflict exists. Any potential conflicts are preferably displayed on the vertical profile display in the cockpit of host aircraft 100, as illustrated in FIG. 12B.

While preferred embodiments of the invention have been illustrated and described, it will be appreciated that various changes can be made therein without departing from the spirit and scope of the invention.

What is claimed is:

1. An electronic circuit for converting a signal conveying situational awareness information relative to an aircraft hosting the electronic circuit, the electronic circuit comprising:
   a memory for storing a plurality of machine instructions;
   a processor coupled to said memory, said processor executing said plurality of machine instructions to implement a plurality of functions, said functions comprising:
      defining a vertical sampling volume relative to the host aircraft;
      receiving a signal processed as situational awareness information;
      transposing said situational awareness information relative to said vertical sampling volume; and
      generating a video signal of said situational awareness information relative to said vertical sampling volume.

2. The electronic circuit recited in claim 1, wherein said situational awareness information further comprises position information of other aircraft relative to the host aircraft.

3. The electronic circuit recited in claim 2, wherein said situational awareness information further comprises potential conflict information.

4. The electronic circuit recited in claim 3, wherein:
   said transposing said situational awareness information relative to said vertical sampling volume further comprises transposing said situational awareness information into a vertical profile view relative to said vertical sampling volume; and
   generating a video signal of said situational awareness information relative to said vertical sampling volume further comprises generating a video signal of said vertical profile view of said situational awareness information relative to said vertical sampling volume.

5. The electronic circuit recited in claim 4, wherein:
said functions further comprise determining conflict solution information; and
said video signal further comprises said conflict solution information.

6. An electronic circuit for converting a signal conveying position data of other aircraft relative to an aircraft hosting the electronic circuit, the electronic circuit comprising:
 a) a memory for storing a plurality of machine instructions;
 b) a processor coupled to said memory, said processor executing said plurality of machine instructions to implement a plurality of functions, said functions including:
  i) accessing a signal processed as situational awareness information relative to the host aircraft;
  ii) defining said situational awareness information relative to a vertical sampling volume defined relative to the host aircraft;
  iii) transposing said situational awareness information into a vertical profile view relative to said vertical sampling volume; and
  iv) generating a video signal of said vertical profile view of said situational awareness information.

7. The electronic circuit recited in claim 6, wherein said situational awareness information further comprises position information of other aircraft relative to the host aircraft.

8. The method recited in claim 7, wherein said situational awareness information further comprises potential conflict information.

9. The method recited in claim 8, wherein:
aid functions further comprise determining conflict solution information; and
said video signal further comprises said conflict solution information.

10. The method recited in claim 9, further comprising a display adapted to receive said video signal and generating a two-dimensional display of said situational awareness information.

11. A method for using an electronic circuit to convert a signal conveying position data of other aircraft relative to an aircraft hosting equipment implementing the method, the method comprising:
 a) processing the signal as situational awareness information relative to the host aircraft;
 b) with the electronic circuit, defining said situational awareness information relative to a vertical sampling volume defined relative to the host aircraft;
 c) with the electronic circuit, transposing said situational awareness information into a vertical profile view relative to said vertical sampling volume; and
 d) displaying said vertical profile view of said situational awareness information.

12. The method recited in claim 11, wherein said situational awareness information further comprises position information of other aircraft relative to the host aircraft.

13. The method recited in claim 12, wherein said situational awareness information further comprises potential conflict information.

14. The method recited in claim 13, further comprising with the electronic circuit, determining conflict solution information; and wherein said displaying said vertical profile view of said situational awareness information further comprises displaying said conflict solution information.

15. A method for displaying vertical situational awareness information relative to an aircraft hosting equipment implementing the method, the method comprising:
 defining a vertical sampling volume;
 detecting aircraft intruding into said sampling volume;
 determining a range and altitude of said intruding aircraft; and
 displaying in a two-dimensional vertical profile view information describing said range and altitude of said intruding aircraft.

16. The method recited in claim 15, further comprising:
 defining a reference frame relative to the host aircraft;
 applying said vertical sampling volume to said reference frame.

17. The method recited in claim 16, further comprising:
 determining a level of threat posed by said intruding aircraft; and
 wherein said information describing said range and altitude of said intruding aircraft further comprises information identifying said level of threat.

18. The method recited in claim 17, wherein said displaying information describing said level of threat posed by said intruding aircraft further comprises displaying a predetermined symbol consistent with conventional traffic display symbology for indicating said determined level of threat.

19. The method recited in claim 17, wherein said detecting intruding aircraft further comprises detecting aircraft positioned within said sampling volume.

20. The method recited in claim 19, further comprising displaying additional information comprising information describing a position of said intruding aircraft relative to a centerline of said vertical sampling volume.

21. The method recited in claim 19, further comprising displaying additional information comprising information indicative of a potential conflict with said intruding aircraft.

22. The method recited in claim 21, further comprising displaying additional information comprising information describing a conflict solution.

23. The method recited in claim 19, wherein said detecting intruding aircraft further comprises detecting aircraft positioned outside of said sampling volume.

24. The method recited in claim 23, further comprising displaying additional information comprising information indicative of a potential conflict with said intruding aircraft.

25. The method recited in claim 24, wherein said potential conflict with said intruding aircraft further comprises determining said potential conflict as a function of a flight plan of the host aircraft and one of a current track of said intruding aircraft and a flight plan of said intruding aircraft.

26. The method recited in claim 25, further comprising displaying additional information comprising information describing a conflict solution.

27. A method for displaying vertical situational awareness information relative to an aircraft hosting equipment implementing the method, the method comprising:
 defining a three-dimensional sampling reference frame relative to the host aircraft;
 defining a vertical sampling volume comprising a predetermined volume of airspace;
 applying said vertical sampling volume to said sampling reference frame;
 detecting other aircraft within a predetermined range of the host aircraft;

determining a position of said other aircraft relative to said sampling volume;

for each of said other aircraft positioned within said sampling volume, displaying in a two-dimensional vertical profile view a symbol representing a three-dimensional position of said other aircraft.

28. The method recited in claim 27, wherein said displaying a symbol representing a three-dimensional position of said other aircraft within said sampling volume further comprises displaying said symbol in a two-dimensional position representative of said three-dimensional position of said other aircraft relative to the host aircraft.

29. The method recited in claim 28, further comprising:

determining a potential conflict with one or more of said other aircraft; and wherein said displaying a symbol representing a three-dimensional position of said other aircraft further comprises highlighting said symbol.

30. The method recited in claim 29, wherein said highlighting said symbol further comprises one of:

changing a color of said symbol, changing a shape of said symbol, periodically displaying said symbol, framing said symbol, and displaying said symbol within a conflict range box displayed at an estimated range of said potential conflict.

31. The method recited in claim 29, wherein a determined potential conflict with one or more of said other aircraft further comprises a potential conflict with one or more of one said other aircraft positioned within said sampling volume and one said other aircraft positioned outside of said sampling volume.

32. The method recited in claim 31, further comprising displaying additional information comprising a maneuver useful for avoiding said potential conflict.

33. The method recited in claim 32, wherein said determining a potential conflict with one or more of said other aircraft further comprises determining said potential conflict as a function of one of a determined current track of said other aircraft and a determined flight path of said other aircraft.

34. The method recited in claim 33, wherein said determining a potential conflict with one or more of said other aircraft further comprises determining said potential conflict as a function of a determined flight path of the host aircraft.

35. A situational awareness information system for generating and displaying situational awareness information relative to a host aircraft, the situational awareness information system comprising:

a radio frequency transmitter;

a radio frequency receiver;

a signal processor coupled to said transmitter to broadcast radio frequency signals and to said receiver to receive radio frequency signals, said signal processor operating traffic alert and collision avoidance software and generating a video output signal conveying situational awareness information relative to a vertical sampling volume defined relative to the host aircraft;

a display coupled to convert said video output signal and display said situational awareness information as a vertical profile view relative to said vertical sampling volume.

36. The situational awareness information system recited in claim 35, wherein:

said signal processor operating traffic alert and collision avoidance software comprises a first signal processor; and said signal processor generating a video output signal conveying situational awareness information relative to a vertical sampling volume defined relative to the host aircraft comprises a second signal processor.

37. The situational awareness information system recited in claim 36, further comprising a memory coupled to said first signal processor for storing successive positional data frames for aircraft relative to the host aircraft.

\* \* \* \* \*